(12) United States Patent
Franklin et al.

(10) Patent No.: US 10,545,692 B2
(45) Date of Patent: Jan. 28, 2020

(54) MEMORY MAINTENANCE OPERATIONS DURING REFRESH WINDOW

(71) Applicant: SanDisk Technologies LLC, Plano, TX (US)

(72) Inventors: Nathan Franklin, Belmont, CA (US); Ward Parkinson, Boise, ID (US)

(73) Assignee: SanDisk Technologies LLC, Addison, TX (US)

( * ) Notice: Subject to any disclaimer, the term of this patent is extended or adjusted under 35 U.S.C. 154(b) by 37 days.

(21) Appl. No.: 15/945,699

(22) Filed: Apr. 4, 2018

(65) Prior Publication Data

US 2018/0285007 A1    Oct. 4, 2018

Related U.S. Application Data

(60) Provisional application No. 62/481,300, filed on Apr. 4, 2017.

(51) Int. Cl.
*G06F 3/06* (2006.01)
*G06F 12/02* (2006.01)

(52) U.S. Cl.
CPC .......... *G06F 3/0629* (2013.01); *G06F 3/0611* (2013.01); *G06F 3/0619* (2013.01); *G06F 3/0625* (2013.01); *G06F 3/0652* (2013.01); *G06F 3/0679* (2013.01); *G06F 12/0246* (2013.01); *G06F 2212/1041* (2013.01); *G06F 2212/7202* (2013.01); *G06F 2212/7205* (2013.01)

(58) Field of Classification Search
CPC ...... G06F 3/0629; G06F 3/061; G06F 3/0619; G06F 3/0625; G06F 3/0652; G06F 3/0679; G06F 12/0246
See application file for complete search history.

(56) References Cited

U.S. PATENT DOCUMENTS

| 2003/0204669 A1* | 10/2003 | Ranganathan | G06F 13/1636 |
| | | | 711/106 |
| 2013/0185606 A1* | 7/2013 | Fai | G06F 11/1068 |
| | | | 714/704 |
| 2016/0132253 A1* | 5/2016 | Chiu | G06F 3/0608 |
| | | | 711/103 |
| 2017/0220293 A1* | 8/2017 | Kim | G11C 5/06 |
| 2018/0246817 A1* | 8/2018 | Feehrer | G06F 12/1081 |

OTHER PUBLICATIONS

Joosung Yun et al., Dynamic Wear Leveling for Phase-Change Memories With Endurance Variations, IEEE Transactions on Very Large Scale Integration (VLSI) Systems, vol. 23, No. 9, Sep. 2015.
Burton H. Bloom, Space/Time Trade-offs in Hash Coding with Allowable Errors, Communications of the ACM, vol. 13, No. 7, Jul. 1970.

* cited by examiner

*Primary Examiner* — Ryan Bertram
(74) *Attorney, Agent, or Firm* — Vierra Magen Marcus LLP

(57) ABSTRACT

Apparatuses, systems, methods, and computer program products are disclosed for memory maintenance operations. A non-volatile memory device comprises a non-volatile memory medium. A non-volatile memory device is configured to receive a refresh command from a controller over a bus. A non-volatile memory device is configured to perform one or more maintenance operations on a non-volatile memory medium during a predefined period of time after receiving a refresh command.

25 Claims, 10 Drawing Sheets

| /CS 702 | /RAS 704 | /CAS 706 | /WE 708 | Address 710 | Command 712 |
|---|---|---|---|---|---|
| H | - | - | - | - | Command Inhibit (No Op) 712a |
| L | H | H | H | - | No Op 712b |
| L | H | H | L | - | Burst Terminate 712c |
| L | H | L | H | Column | Read Column from Active Row 712d |
| L | H | L | L | Column | Write Column to Active Row 712e |
| L | L | H | H | Row | Activate Row for Read/Write 712f |
| L | L | H | L | - | Precharge/Deactivate Row 712g |
| L | L | L | H | - | Refresh 712h |
| L | L | L | L | Mode | Load Mode Register 712i |

FIG. 7

MEMORY MAINTENANCE OPERATIONS DURING REFRESH WINDOW

CROSS-REFERENCES TO RELATED APPLICATIONS

This application claims the benefit of U.S. Provisional Patent Application No. 62/481,300 entitled "MEMORY MAINTENANCE OPERATIONS DURING REFRESH WINDOW" and filed on Apr. 4, 2017 for Nathan Franklin, et al., which is incorporated herein by reference in its entirety, for all purposes.

TECHNICAL FIELD

The present disclosure, in various embodiments, relates to maintenance operations for non-volatile memory and more particularly relates to memory maintenance operations performed during a refresh window.

BACKGROUND

As the speed of memory devices increases, it becomes increasingly important to provide or maintain synchronous operation. Non-volatile memory devices, however, typically have background maintenance operations that delay other memory operations, preventing synchronous operation for non-volatile memory devices.

SUMMARY

Apparatuses are presented for memory maintenance operations. In one embodiment, a non-volatile memory device comprises a non-volatile memory medium. A non-volatile memory device, in certain embodiments, is configured to receive a refresh command from a controller over a bus. In some embodiments, a non-volatile memory device is configured to perform one or more maintenance operations on a non-volatile memory medium during a predefined period of time after receiving a refresh command.

Other apparatuses are presented for memory maintenance operations. In one embodiment, an interface circuit is configured to receive commands for a non-volatile dual inline memory module over a memory bus. A read/write circuit, in some embodiments, is configured to execute read and write operations synchronously on a non-volatile dual inline memory module in response to an interface circuit receiving read and write commands. In certain embodiments, a maintenance circuit is configured to perform one or more maintenance operations synchronously on a non-volatile dual inline memory module in response to an interface circuit receiving a synchronous maintenance command.

Additional apparatuses are presented for memory maintenance operations. In some embodiments, an apparatus includes means for periodically receiving refresh triggers at a non-volatile memory over a bus. An apparatus, in certain embodiments, includes means for wear leveling one or more regions of a non-volatile memory exclusively during a predefined time period after receiving one or more of refresh triggers.

Systems are presented for memory maintenance operations. In one embodiment, a memory controller for a host processor sends periodic refresh commands over a host memory bus for the host processor. A non-volatile memory module, in certain embodiments, receives periodic refresh commands from a memory controller over a host memory bus and synchronously performs maintenance operations for the non-volatile memory module in response to receiving the periodic refresh commands Methods are presented for memory maintenance operations. In certain embodiments, a method includes receiving a first refresh command at a non-volatile memory device from a controller over a bus. A method, in a further embodiment, includes performing a first maintenance operation on a non-volatile memory device in response to receiving a first refresh command. A method, in some embodiments, includes receiving a second refresh command at a non-volatile memory device from a controller over a bus. In one embodiment, a method includes selectively determining not to perform a second maintenance operation on a non-volatile memory device in response to receiving a second refresh command.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 7 is a schematic block diagram illustrating embodiments of memory commands;

DETAILED DESCRIPTION

Figure 1:
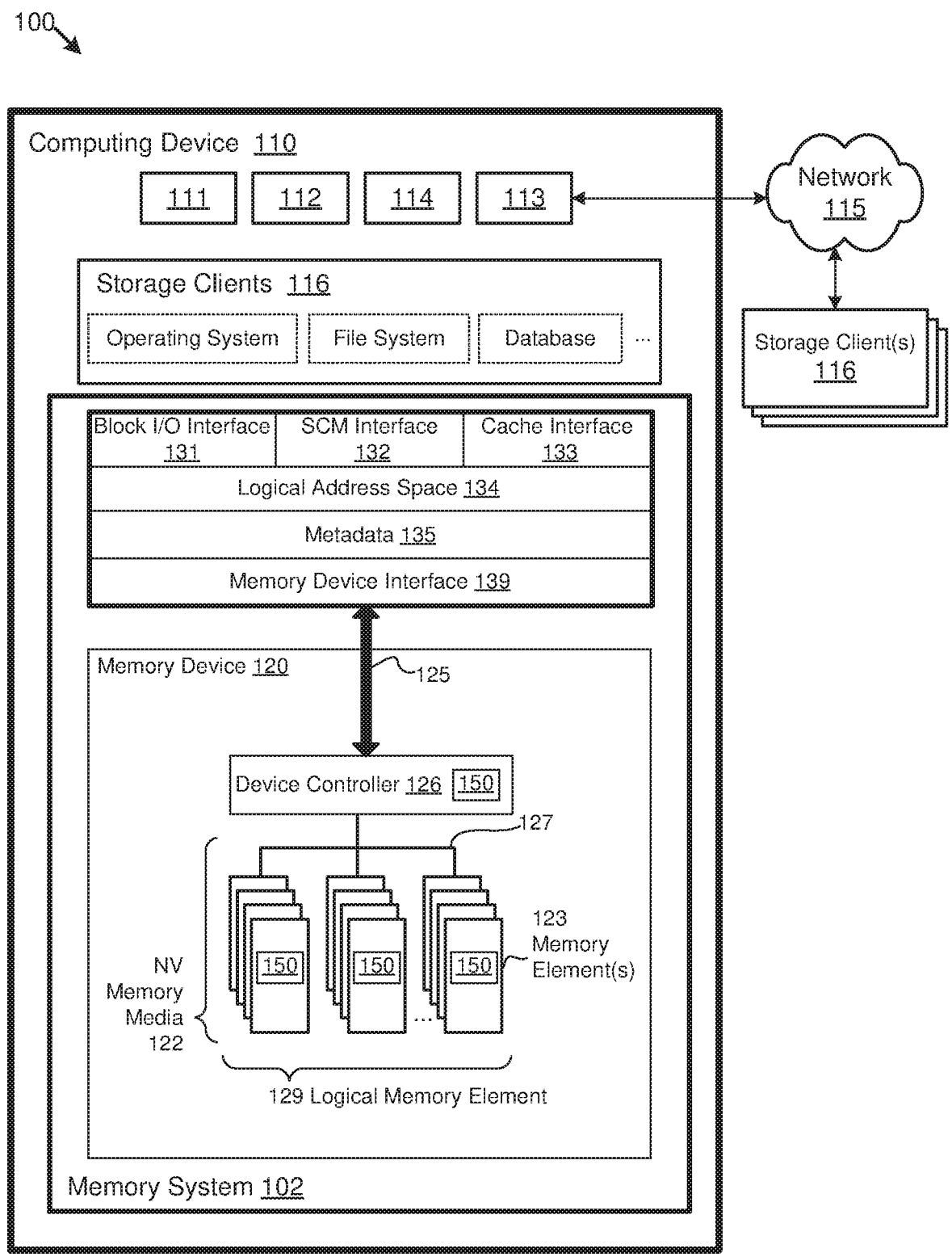
FIG. 1 is a schematic block diagram of one embodiment of a system for memory maintenance operations during a refresh window.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 for memory maintenance operations during a refresh window. The system 100 comprises one or more maintenance components 150 for a non-volatile and/or volatile memory device 120. A maintenance component 150 may be part of a non-volatile and/or volatile memory element 123, and may be in communication with a non-volatile and/or volatile memory media controller 126, a device driver, or the like. In some embodiments, a maintenance component 150 may at least partially operate on and/or in communication with a non-volatile and/or volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or memory controller 126 to a communication network 115, such as an Internet Protocol (IP) network, a Storage Area Network (SAN), wireless network, wired network, or the like.

The memory device 120, in various embodiments, may be disposed in one or more different locations relative to the computing device 110. In one embodiment, the memory device 120 comprises one or more non-volatile and/or volatile memory elements 123, such as semiconductor chips or packages or other integrated circuit devices disposed on one or more printed circuit boards, storage housings, and/or other mechanical and/or electrical support structures. For example, the memory device 120 may comprise one or more direct inline memory module (DIMM) cards, one or more expansion cards and/or daughter cards, a memory card, a universal serial bus (USB) drive, a solid-state-drive (SSD) or other hard drive device, and/or may have another memory and/or storage form factor. The memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the maintenance component 150 may include one or more computer readable instructions stored on the non-transitory storage medium 114.

The non-volatile and/or volatile memory system 102, in the depicted embodiment, includes one or more maintenance components 150. A maintenance component 150, in one embodiment, is configured to perform one or more maintenance operations on one or more memory elements 123 during a window or other time period after a refresh command and/or request (e.g., from a memory controller, a device controller 126, from a device driver, from a host computing device 110, from a processor 111, from a storage client 116, or the like). A maintenance component 150, in certain embodiments, may repurpose, reuse, and/or override a refresh command from a protocol and/or specification for a different type of memory (e.g., a volatile memory standard, a dynamic random access memory (DRAM) standard, a Joint Electron Device Engineering Council (JEDEC) standard, a JEDEC double data rate (DDR) three (DDR3) synchronous DRAM (SDRAM) standard, a JEDEC DDR4 SDRAM standard, or the like) to trigger a non-volatile memory maintenance operation, to maintain compatibility with the protocol and/or specification but for a different type of memory (e.g., maintaining legacy compatibility).

By performing a maintenance operation or portion thereof in response to a refresh command, instead of, or in addition to, performing the maintenance operation in the background, in some embodiments, a maintenance component 150 may allow a non-volatile memory element 123 and/or a non-volatile memory device 120 to operate synchronously (e.g., responding to a storage request such as a read or write request with little or no delay from performing a background maintenance operation and/or otherwise communicating synchronously with a host 110, a processor 111, or the like). Synchronous operation of a non-volatile memory device 120 and/or a non-volatile memory element 123, as used herein, comprises a non-volatile memory device 120 and/or a non-volatile memory element 123 recognizing control inputs (e.g., commands, data, addresses, or the like) in response to an external clock input (e.g., over a memory bus 125 or the like).

In certain embodiments, a non-volatile memory device 120 and/or a non-volatile memory element 123 may satisfy and/or respond to a command synchronously as part of a same transaction on the memory bus 125 (e.g., using an uninterrupted set of one or more clock cycles on the memory bus 125 between receiving a command and acknowledging and/or providing data of the command). For example, in embodiments where a non-volatile memory device 120 and/or a non-volatile memory element 123 operate synchronously, a memory controller for a processor 111 may receive read data or the like substantially immediately (e.g., within a predefined number of clock cycles and/or clock edges), rather than polling the non-volatile memory device 120 and/or the non-volatile memory element 123 for the read data at a later time. While performing maintenance operations in the background (e.g., before and/or during performing a read and/or write operation for a storage client 116 or the like) may prevent synchronous operation of a non-volatile memory device 120 and/or a non-volatile memory element 123, performing maintenance operations during a refresh window or other predefined time period after receiving a refresh command may enable synchronous operation.

For example, a volatile memory refresh operation may be performed periodically (e.g., about every 64 ms for each volatile memory cell, or the like) in response to a refresh command from a host memory controller (e.g., sent by the host memory controller about every 7.8 us or the like, rotating through portions of the volatile memory cells such that they are all periodically refreshed). After the refresh command, the volatile memory may be unavailable for a refresh window or time period (e.g., between about 160 ns and 350 ns, or the like) during which data is read from and written back to the volatile memory cells to preserve the data, either reading and writing the data within the memory element 123 or reading the data our from the memory element 123 to a controller 126 and back to the memory element 123.

Without refresh operations reading and rewriting data at predefined intervals, volatile memory such as DRAM, SDRAM, or the like may lose stored data over time (e.g., as electric charge leaks from a capacitive volatile memory cell, or the like). Non-volatile memory, however, may not require refreshing, and least not as frequently as volatile memory.

However, for compatibility with the same host memory controller and/or refresh command, in certain embodiments, a maintenance component 150 may perform one or more maintenance operations or a portion thereof on non-volatile memory cells of a non-volatile memory medium 122 of one or more non-volatile memory elements 123 in response to a refresh command. For example, a maintenance component 150 may instead, or on occasion, use or repurpose some or all of the refresh commands to perform a different maintenance operation for a type of memory medium 122 that doesn't require a volatile memory refresh operation such as storage class memory or other non-volatile memory, and/or may perform a different type of maintenance operation for a memory medium 122 that does require a volatile memory refresh operation (e.g., in addition to a volatile memory refresh operation), or the like.

A maintenance operation may comprise a management and/or system operation for a memory medium 122 (e.g., that is not in response to a read and/or write request from a storage client 116 or the like). In one embodiment, a maintenance operation comprises a wear leveling operation, such as moving and/or remapping a region of memory (e.g., logically remapping), moving data from one region of memory to another, or the like. In a further embodiment, a maintenance operation comprises a memory refresh operation, such as a garbage collection or storage capacity recovery operation to move valid data to a different region of memory while recovering invalid data and/or correcting data errors using on or off-chip error correction, rewriting data to the same region or a different region of memory to prevent data loss, rotating data within a single memory region, or the like (e.g., in response to a predefined temperature condition, a predefined time condition, a predefined read disturb condition, a predefined write disturb condition, or the like). A maintenance operation, in certain embodiments, comprises a replacement operation such as replacing and/or retiring a region of memory (e.g., failing and/or near failing memory cells), logically remapping spare or extra storage capacity to replace a region of memory, or the like. A region of memory may comprise a group of one or more memory cells, such as a memory element 123, a page, a block (e.g., an erase block, a block of a predefined size, or the like), a word line, a bit line, a page, a chip, a die, a die plane, or the like.

A maintenance component 150 may divide or break up one or more maintenance operations (e.g., non-volatile memory maintenance operations) to fit within a refresh window of a refresh command (e.g., a volatile memory refresh command). For example, a maintenance component 150 may read data during a refresh window after a first refresh command. The maintenance component 150 may, in the same or a subsequent refresh window, buffer the data, and/or write the data (e.g., to the same memory region, to a different memory region, swap and/or rotate the data, or the like) during a subsequent refresh window after a subsequent refresh command. Performing maintenance operations only during a refresh window after a refresh command, in certain embodiments, may allow a memory element 123 to operate synchronously and/or with minimal latency for normal read and/or write operations (e.g., without delay of read or write commands caused by performance of a maintenance operation in the background, or the like).

In certain embodiments, a maintenance component 150 may dynamically select one of a plurality of different types of maintenance operations to perform during a refresh window in response to receiving a refresh command. In one embodiment, a maintenance component 150 may perform at least a portion of multiple types of maintenance operations during the same refresh window after a single refresh command. For example, a refresh command may comprise a generic refresh command that does not specify a type of maintenance operation, on which memory cells to perform a maintenance operation (e.g., a refresh command with no address and/or identifier), or the like and the maintenance component 150 may dynamically manage performance of maintenance operations in response to refresh commands.

In certain embodiments, a maintenance component 150 may allow a refresh command to be sent less frequently than is specified for a volatile memory refresh command (e.g., because non-volatile memory media 122 does not require a volatile memory refresh, because the maintenance component 150 may complete maintenance operations in less time than a volatile memory refresh, to conserve power, or the like). In a further embodiment, a maintenance component 150 may allow custom and/or flexible timing of refresh commands (e.g., one refresh for every N write and/or read commands, sending/receiving a plurality of refresh commands at once and/or in a group, an extended or longer refresh window time period if allowed and/or authorized by a host, or the like). In one embodiment, a maintenance component 150 may selectively skip performing any, or one or more maintenance operations in response to receiving a refresh command (e.g., because non-volatile memory media 122 does not require a volatile memory refresh, because the maintenance component 150 may complete maintenance operations in less time than a volatile memory refresh, to conserve power, preserve remaining battery life, or the like).

In one embodiment, a maintenance component 150 may comprise logic hardware of a non-volatile and/or volatile memory element 123, other programmable logic, firmware for a non-volatile and/or volatile memory element 123, microcode for execution by a non-volatile and/or volatile memory element 123, or the like. In another embodiment, a maintenance component 150 may comprise executable software code, stored on a computer readable storage medium for execution by logic hardware of a non-volatile and/or volatile memory element 123. In a further embodiment, a maintenance component 150 may include a combination of both executable software code and logic hardware.

In one embodiment, the maintenance component 150 is configured to receive storage requests and/or refresh commands from a memory controller (e.g., for a processor 111), a device driver or other executable application via buses 125, 127, a memory media controller 126, or the like. The maintenance component 150 may be further configured to transfer data to/from a memory controller, a device driver and/or storage clients 116, or the like via the bus 125. Accordingly, a maintenance component 150, in some embodiments, may comprise and/or be in communication with one or more direct memory access (DMA) modules, remote DMA modules, bus controllers, bridges, buffers, or the like to facilitate the transfer of storage requests and/or associated data. In another embodiment, a maintenance component 150 may receive storage requests and/or refresh commands as an API call from a storage client 116, as an IO-CTL command, or the like.

In one embodiment, a maintenance component 150 is disposed on a device controller 126 or other interposer between a host device 110 and/or processor 111 and a memory element 123, and receives refresh commands for the memory element 123 on the device controller 126 or another interposer. In another embodiment, a maintenance component 150 is integrated on a memory element 123 (e.g., an on-die controller, a state machine, and/or other logic hardware or executable code) and receives refresh commands directly from a host device 110 and/or processor 111 without an interposer therebetween. In other embodiments, a portion of a maintenance component 150 may be disposed on a device controller 126 or other interposer and a portion of a maintenance component 150 may be disposed on a memory element 123.

According to various embodiments, a memory controller 126 may manage one or more memory devices 120 and/or memory elements 123. The memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a memory device 120). Memory units and/or regions may include, but are not limited to: pages, memory divisions, blocks, sectors, collections or sets of physical storage locations (e.g., logical pages, logical blocks), or the like.

A device driver and/or the memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the memory device 120 may maintain metadata 135, such as a logical to physical address mapping structure, to map logical addresses of the logical address space 134 to media storage locations on the memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more memory devices 120. The one or more memory devices 120 may include different types of memory devices including, but not limited to: solid-state storage devices, semiconductor storage devices, SAN storage resources, volatile memory devices, non-volatile memory devices, or the like. The one or more memory devices 120 may comprise one or more respective memory media controllers 126 and memory media 122. A device driver may provide access to the one or more memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the memory device 120. Also, in some embodiments, the SCM interface 132 presented to the storage clients 116 provides access to data transformations implemented by the one or more memory devices 120 and/or the one or more memory media controllers 126.

A device driver may present a logical address space 134 to the storage clients 116 through one or more interfaces. As discussed above, the logical address space 134 may comprise a plurality of logical addresses, each corresponding to respective media locations the on one or more memory devices 120. A device driver may maintain metadata 135 comprising any-to-any mappings between logical addresses and media locations, or the like.

A device driver may further comprise and/or be in communication with a memory device interface 139 configured to transfer data, commands, and/or queries to the one or more memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The memory device interface 139 may communicate with the one or more memory devices 120 using input-output control (IO-CTL) command(s), IO-CTL command extension(s), remote direct memory access, or the like.

The communication interface 113 may comprise one or more network interfaces configured to communicatively couple the computing device 110 and/or the memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The memory controller 126 is part of and/or in communication with one or more memory devices 120. Although FIG. 1 depicts a single memory device 120, the disclosure is not limited in this regard and could be adapted to incorporate any number of memory devices 120, a combination of one or more volatile memory devices 120 and one or more non-volatile memory devices 120, or the like.

The memory device 120 may comprise one or more elements 123 of memory media 122. In one embodiment, an element 123 of memory media 122 comprises a volatile memory medium 122, such as random access memory (RAM), dynamic RAM (DRAM), synchronous DRAM (SDRAM), double data rate (DDR) SDRAM, static RAM (SRAM), thyristor RAM (T-RAM), zero-capacitor RAM (Z-RAM), or the like. In certain embodiments, an element 123 of memory media 122 comprises a non-volatile memory medium 122, such as ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; or may have a lower cost, use less power, and/or have a higher bit storage density per chip than DRAM; or may offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like.

Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102. A device driver may further comprise a non-volatile memory device interface 139 that is configured to transfer data, commands, and/or queries to the non-volatile memory media controller 126 over a bus 125, as described above.

Figure 2:
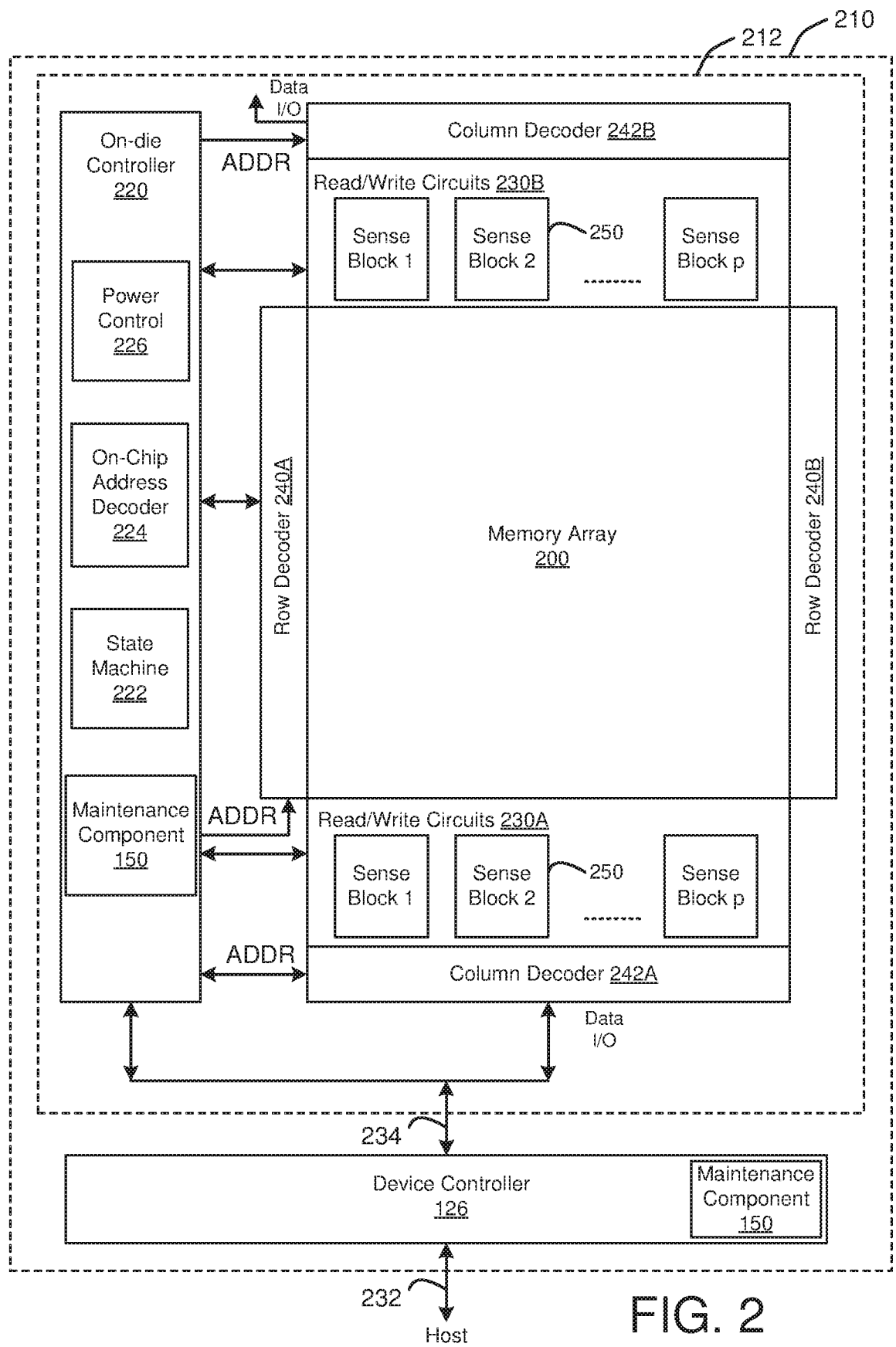
FIG. 2 is a schematic block diagram illustrating another embodiment of a system for memory maintenance operations during a refresh window.

FIG. 2 illustrates an embodiment of a non-volatile storage device 210 that may include one or more memory die or chips 212. The nonvolatile storage device 210 may be substantially similar to the nonvolatile memory device 120 described with reference to FIG. 1. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 126 is included in the same memory device 210 (e.g., a removable storage card or package) as the one or more memory die 212. Commands and data are transferred between the host and controller 126 via lines 232 and between the controller and the one or more memory die 212 via lines 234. One implementation can include multiple chips 212.

A die controller 220, in one embodiment, cooperates with the read/write circuits 230A/230B to perform memory operations on the memory array 200. The die controller 220 and/or the device controller 126, in certain embodiments, includes a maintenance component 150, a state machine 222, an on-chip address decoder 224, and a power control circuit 226. The maintenance component 150, in one embodiment, is configured to perform one or more maintenance operations on the memory array 200 in response to a refresh command from a memory controller of the host 110 over the lines 232, from the device controller 126 over the lines 234, or the like.

The state machine 222, in one embodiment, provides chip-level control of memory operations. The on-chip address decoder 224 provides an address interface to convert between the address that is used by the host or a memory controller to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In certain embodiments, the state machine 222 includes at least a portion of the maintenance component 150. The maintenance component 150, in certain embodiments, may include software, firmware, and/or hardware of a die controller 220, a state machine 222, and/or a device controller 126.

In one embodiment, one or any combination of die controller 220, device controller 126, maintenance component 150, power control circuit 226, decoder circuit 224, state machine circuit 222, decoder circuit 242A, decoder circuit 242B, decoder circuit 240A, decoder circuit 240B, read/write circuits 230A, read/write circuits 230B, and/or controller 126 can be referred to as one or more managing circuits.

Figure 3:
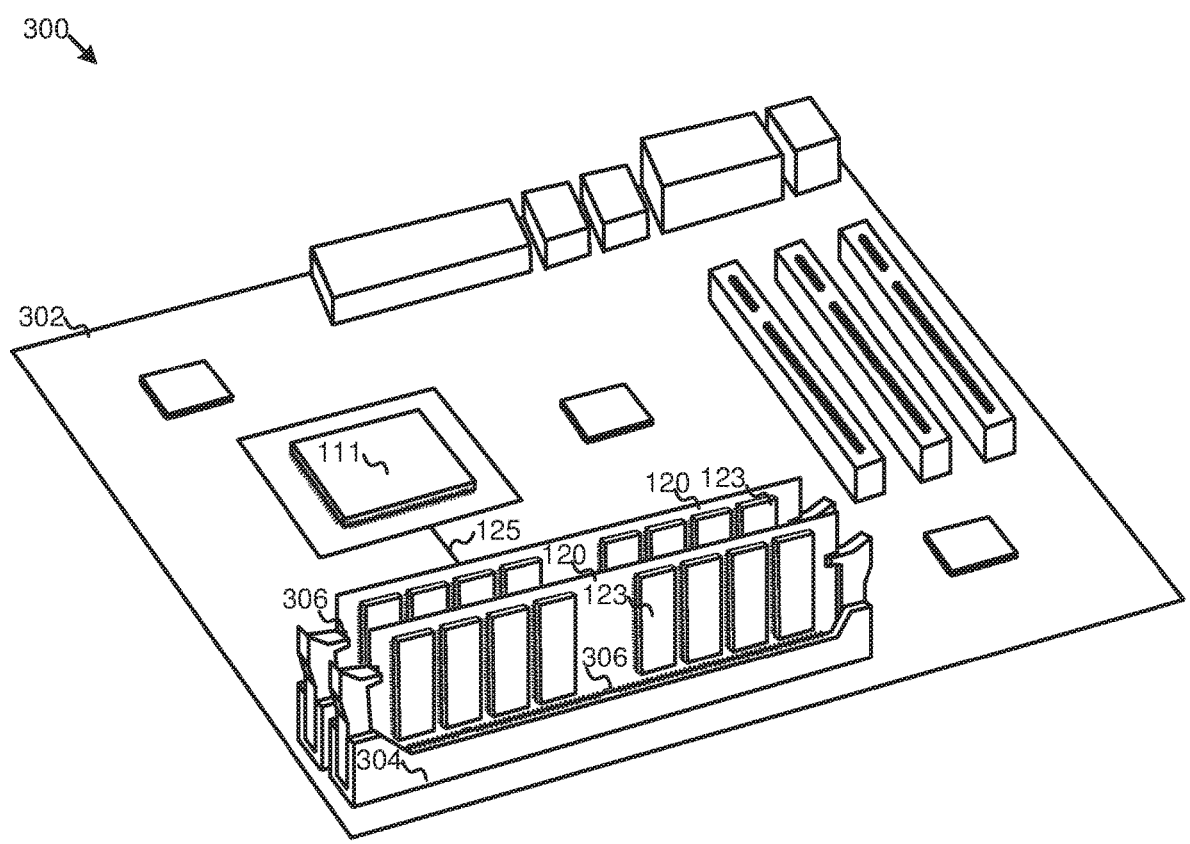
FIG. 3 is a schematic block diagram illustrating a further embodiment of a system for memory maintenance operations during a refresh window.

FIG. 3 depicts one embodiment of a system 300 for memory maintenance operations during a refresh window. The system 300, in the depicted embodiment, includes a motherboard 302 or other printed circuit board 302 with one or more memory sockets 304, a processor 111, a memory bus 125, and one or more non-volatile memory devices 120 of non-volatile memory elements 123.

In one embodiment, the motherboard 302 or other printed circuit board 302 comprises one or more insulators, one or more conductors, or the like to provide electrical connections and/or mechanical support for the processor 111, for the one or more non-volatile memory devices 120 (e.g., through the one or more memory sockets 304). The one or more memory sockets 304, in certain embodiments, may provide one or more electrical connections from the motherboard 302 and/or processor 111 to the one or more non-volatile memory devices 120, such as electrical connections to the memory bus 125, or the like. The one or more memory sockets 304 may provide mechanical support to the one or more non-volatile memory devices 120 (e.g., with one or more locking mechanisms, a memory slot, one or more keys, or the like). The one or more memory devices 120 may comprise one or more notches 306 and/or other mechanical interfaces 306 configured to mechanically interface with a memory socket 304, to provide alignment of a memory device 120 with regard to a memory socket 304, or the like.

In certain embodiments, the one or more memory sockets 304 may comprise volatile memory sockets 304 coupled to the motherboard 302 and to the host memory bus 125. A non-volatile memory device 120 may comprise volatile memory mechanical and electrical connections 306, complementary to the volatile memory mechanical and electrical connections of a volatile memory socket 304 configured to receive a volatile memory module, in order to interface with the volatile memory socket 304. In this manner, a non-volatile memory device 120 may receive periodic volatile memory refresh commands, read command, write commands, or the like from the host memory bus 125 through a volatile memory socket 304, having the benefits of a non-volatile memory medium 122 and compatibility with a volatile memory interface of the volatile memory socket 304.

In one embodiment, the processor 111 may comprise a central processing unit (CPU), one or more CPU cores, a microprocessor, an application-specific instruction set processor (ASIP), a graphics processing unit (GPU), or the like. The processor 111 may support an x86 instruction set, a reduced instruction set computing (RISC) instruction set, an advanced RISC machine (ARM) instruction set, or the like. As described in greater detail below with regard to FIG. 4A and FIG. 4B, in certain embodiments, a processor 111 may comprise and/or be in communication with a memory controller 402, which may manage and/or control the one or more non-volatile memory devices 120. The memory controller 402 may comprise a volatile memory controller 402 that periodically sends refresh commands over the memory bus 125 to one or more non-volatile memory devices 120 (e.g., through the one or more memory sockets 304).

In one embodiment, the memory bus 125 comprises one or more electrical conductors that transmit commands, data, addresses, and/or other signals to the one or more non-volatile memory devices 120 (e.g., through the one or more memory sockets 304). The memory bus 125 may be a volatile memory bus 125, designed and/or intended for a volatile memory device, but used by the one or more non-volatile memory devices 120 to provide synchronous non-volatile storage for the processor 111 over the volatile memory bus 125 (e.g., with reverse compatibility with the volatile memory bus 125, one or more volatile memory protocols such as a volatile memory refresh command, a volatile memory read command, a volatile memory write command, or the like). As described in greater detail below with regard to FIG. 7, in certain embodiments, the memory bus 125 may comprise a chip enable/chip select (CS) line, a row address strobe (RAS) line, a column address strobe (CAS) line, a write enable (WE) line, one or more address lines, one or more data lines, or the like.

The one or more non-volatile memory devices 120, in certain embodiments, comprise one or more dual in-line memory modules (DIMMs), with a series of memory elements 123 on a single printed circuit board (PCB), which may have separate electrical contacts on each side of the DIMM (e.g., 72 pins, 100 pins, 144 pins, 168 pins, 172 pins, 184 pins, 200 pins, 204 pins, 214 pins, 240 pins, 244 pins, 260 pins, 278 pins, 288 pins, more pins, or the like), may have memory elements 123 on one or both sides of the PCB (e.g., single-sided or double-sided), or the like. Each memory element 123 may provide a predefined number of bits (e.g., a data width), may be accessed in parallel, or the like. For example, if a non-volatile memory device 120 comprises nine memory elements 123 per side, with a four bit data width, the non-volatile memory device 120 may provide 36 bits per side or 72 bits total (e.g., if both sides are accessed in parallel). In a further example, with an eight bit data width, the non-volatile memory device 120 may provide 72 bits per side (e.g., 64 bits of user data and 8 bits of error correcting code (ECC) data, or the like). A non-volatile memory device 120 may operate at a single data rate (SDR) (e.g., with data clocked at a single clock edge per clock cycle), at a double data rate (DDR) (e.g., with data clocked on both clock edges per clock cycle), or the like.

In various embodiments, the motherboard 302 may be for a host computing device 110, such as a desktop computer, a laptop or other mobile computer, a server computer, a mobile device such as a smartphone or tablet, a television, a set top box, a network appliance, a video game system, a portable gaming device, a navigation device, an automobile or other vehicle, and/or another electronic device capable of sending data to and/or receiving data from a non-volatile memory device 120. For example, in embodiments where the motherboard 302 is for a mobile device, the one or more memory sockets 304 may be for mobile DDR (MDDR), low power DDR (LPDDR), or the like, and the one or more non-volatile memory devices 120 may be compatible with a low power DDR (e.g., LPDDR1) mobile volatile memory protocol. While the one or more memory sockets 304 are depicted as removably coupling the one or more non-volatile memory devices 120 to the motherboard 302, in other embodiments, the one or more memory sockets 304 may comprise electrical contacts (e.g., electrical pads, pins, or the like) on a surface of the motherboard 302, to which corresponding electrical contacts of a non-volatile memory device 120 may be coupled (e.g., with soldering, surface-mount packaging such as a ball grid array or pin grid array, through hole connections, or the like).

Figure 4A:
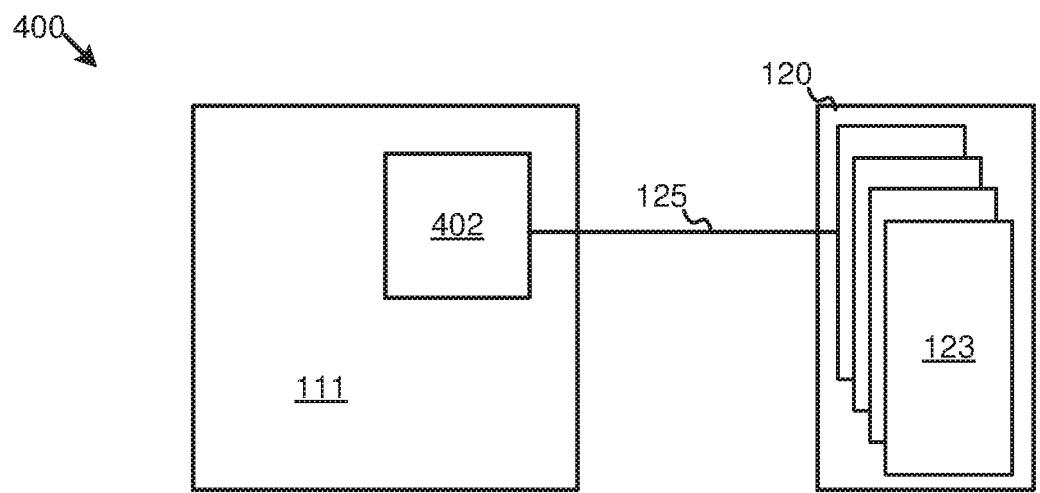
FIG. 4A is a schematic block diagram illustrating a certain embodiment of a system for memory maintenance operations during a refresh window.

FIG. 4A depicts one embodiment of a system 400 for memory maintenance operations during a refresh window. The system 400, in the depicted embodiment, includes a processor 111, a memory controller 402, a memory bus 125, a non-volatile memory device 120, and one or more non-volatile memory elements 123.

In the depicted embodiment, the processor 111 includes the memory controller 402 (e.g., as an integrated memory controller 402). The memory controller 402 may synchronously control the non-volatile memory device 120 (e.g., sending one or more synchronous read commands, one or more synchronous write commands, one or more synchronous refresh commands, or the like), which the non-volatile memory device 120 may execute substantially immediately (e.g., within a predefined window after receiving a command, with little or no delay, without executing a background operation, or the like). The memory controller 402 may comprise a volatile memory controller 402 configured to send periodic refresh commands to the non-volatile memory device 120 over the memory bus 125.

Figure 4B:
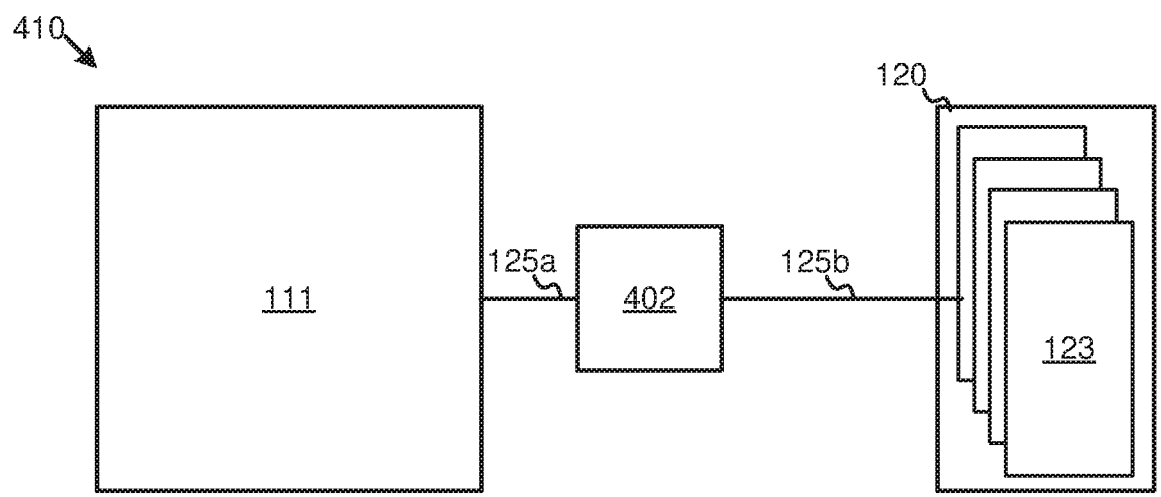
FIG. 4B is a schematic block diagram illustrating an embodiment of a system for memory maintenance operations during a refresh window.

FIG. 4B depicts a further embodiment of a system 410 for memory maintenance operations during a refresh window. The system 410, in the depicted embodiment, includes a processor 111, a memory controller 402, one or more memory buses 125a-b, a non-volatile memory device 120, and one or more non-volatile memory elements 123.

The system 410, in certain embodiments, may be substantially similar to the system 400, but with the memory controller 402 external to the processor 111. For example, the memory controller 402 may comprise a separate and/or independent chip or other integrated circuit device in communication with the processor 111 (e.g., as part of a chipset, as a Northbridge chip, or the like). The memory controller 402 may be in communication with the processor 111 over a first memory bus 125a, such as a front-side bus 125a, or the like, and may be in communication with the non-volatile memory bus 120 over a second memory bus 125b (e.g., a volatile memory bus 125b or the like). In other embodiments, the memory controller 402 may be co-located with the one or more non-volatile memory elements 123 on the non-volatile memory device 120 (e.g., as a device controller 126 or the like), may comprise an on-die controller 220 on each non-volatile memory element 123, and/or may have a different location relative to the one or more non-volatile memory elements 123.

Figure 5:
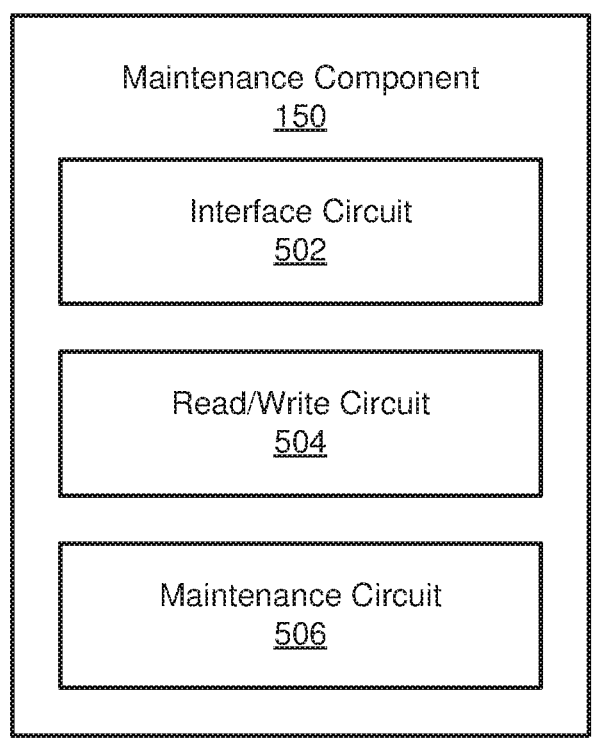
FIG. 5 is a schematic block diagram illustrating one embodiment of a maintenance component.

FIG. 5 depicts one embodiment of a maintenance component 150. In certain embodiments, the maintenance component 150 may be substantially similar to one or more of the maintenance circuits 150 described above with regard to FIG. 1 and/or FIG. 2. The maintenance component 150, in the depicted embodiment, includes an interface circuit 502, a read/write circuit 504, and a maintenance circuit 506.

In one embodiment, the interface circuit 502 is configured to receive commands, addresses, and/or data for a non-volatile memory device 120 (e.g., a non-volatile dual inline memory module (DIMM) or the like) over a memory bus 125, provide data from the non-volatile memory device 120 over the memory bus, or the like. For example, the interface circuit 502 may communicate with a memory controller 402 for a processor 111 over a memory bus 125.

Example commands 712a-i which the interface circuit 502 may receive from a memory controller 402 (e.g., over a CS line 702, a RAS line 704, a CAS line 706, a WE line 708, one or more address lines 710, or the like of a memory bus 125) are described below with regard to FIG. 7, such as a command inhibit command 712a, a no operation command 712b, a burst terminate command 712c, a read command 712d, a write command 712e, an activate row command 712f, a precharge/deactivate command 712g, a refresh command 712h, a load mode register command 712i, or the like. The interface circuit 502 may receive commands, addresses, and/or data from a memory bus 125 over pins or other electrical contacts of the non-volatile memory device 120 in electrical communication with the memory bus 125 through an electrical interface of the one or more memory sockets 304, or the like.

A refresh command, as used herein, comprises a signal, indicator, message, and/or other trigger. A refresh command may be sent from a memory controller 402 over a memory bus 125. A memory controller 402 may periodically send a refresh command with a predefined frequency (e.g., about every 5-10 microseconds, about every 6-9 microseconds, about every 7-8 microseconds, every 7.8 microseconds, or the like). In certain embodiments, a refresh command comprises a volatile memory refresh command (e.g., even if a non-volatile memory device 120 receives the volatile memory refresh command), such as a RAM refresh command, a DRAM refresh command, a SDRAM refresh command, a JEDEC refresh command, a JEDEC DDR3 SDRAM refresh command, a JEDEC DDR4 SDRAM refresh command, or the like.

In one embodiment, instead of being a volatile memory refresh command, a refresh command may comprise a synchronous maintenance command (e.g., a non-volatile memory maintenance command), defined to provide a maintenance window or other predefined period of time for a non-volatile memory device 120 and/or non-volatile memory element 123 to perform one or more maintenance operations, to enable synchronous operation of a non-volatile memory device 120 as described herein. A synchronous maintenance command may turn control of a non-volatile memory device 120 and/or a non-volatile memory element 123 to the device 120 and/or element 123 itself, or to an associated controller 126, 220 for one or more maintenance operations during a maintenance period, after which control may be returned to the memory controller 402 for synchronous read/write operation, or the like.

For volatile memory such as DRAM, each memory cell must be refreshed periodically (e.g., once every 64 msec, or the like). This may be done, for example, by issuing a refresh command every 8 usec where ⅛₀₀₀ of the memory cells on the volatile memory element are refreshed during each refresh command. In another example, all 8000 refresh commands may be provided serially every 64 msec, or the like. In one embodiment, a refresh command may include an address (e.g., a row address or the like), and the memory controller 402 may manage and determine which memory cells are refreshed. In a further embodiment, a refresh command does not include an (e.g., an "auto" refresh), allowing a memory device 120 and/or a memory element 123 to internally determine which memory cells to refresh (e.g., a refresh address may be automatically determined on chip).

In certain embodiments, a refresh command comprises a combination of one or more signals on a memory bus 125. For example, a refresh command may comprise predefined states of and/or signals on one or more of a chip enable/chip select (CS) line, a row address strobe (RAS) line, a column address strobe (CAS) line, a write enable (WE) line (e.g., a low voltage state on a chip enable/chip select (CS) line, a low voltage state on a row address strobe (RAS) line, a low voltage state on a column address strobe (CAS) line, a high voltage state on a write enable (WE) line, and/or another predefined state or combination of states on lines of the memory bus 125).

In certain embodiments, a refresh command comprises an address (e.g., on one or more address lines of the memory bus 125), such as a row address (e.g., a volatile memory row address or the like). In one embodiment, the maintenance circuit 506 may perform a maintenance operation for one or more non-volatile memory cells of a non-volatile memory medium 122, the one or more non-volatile memory cells associated with an address of a refresh command. In a further embodiment, the maintenance circuit 506 may disregard an address of a refresh command, managing and/or performing maintenance operations independently of addresses provided by a memory controller 402 with a refresh command, performing a maintenance operation for one or more non-volatile memory cells of a non-volatile memory medium 122 which are not associated with an address received with a refresh command. In other embodiments, a refresh command does not include an address (e.g., an "auto" refresh command, or the like).

A refresh period and/or window, as used herein, comprises a predefined period of time. A refresh period, in certain embodiments, may be defined and/or measured relative to a refresh command, receipt of a refresh command, detection of a refresh command, or the like (e.g., a predefined period of time after the interface circuit 502 receives and/or detects a refresh command, or the like). A duration of a refresh period, in certain embodiments, is selected to provide enough time to refresh data of a predefined portion of a volatile memory (e.g., reading data from an active row of volatile memory, latching the data, and rewriting the data back to the active row of volatile memory). A duration of a refresh period may be defined and/or measured in time, in clock cycles, or the like. In one embodiment, a refresh period comprises a maximum amount of time during which the maintenance circuit 506 may perform one or more maintenance operations (e.g., and the maintenance circuit 506 may take less than a full refresh period to perform one or more maintenance operations, may selectively skip performing any maintenance operations during a commanded refresh period (e.g., on occasion determine to "no-op" and perform no operation), or the like).

A refresh period, in various embodiments, may comprise a time period between about 100-400 nanoseconds, between about 160 and 350 nanoseconds, less than about 160 nanoseconds, about 160 nanoseconds, about 350 nanoseconds, more than about 350 nanoseconds, and/or another predefined period of time. In certain embodiments the read/write circuit 504 does not perform read and/or write operations for storage clients 116 during a refresh period, a maintenance circuit 506 may perform maintenance operations exclusively during a refresh period, or the like, without the read/write circuit 504 performing other commanded operations of the same memory element 123 (e.g., without performing read or write operations requested by the host device 100, a storage client 116, the memory controller 402, or the like).

In certain embodiments, a predefined period of time during which a maintenance circuit 506 performs one or more maintenance operations may comprise up to a full refresh period or window (e.g., as defined for a volatile memory refresh, a volatile memory standard, or the like). In another embodiment, a predefined period of time during which a maintenance circuit 506 performs one or more maintenance operations (e.g., a maintenance period or window) may be defined as less than a full refresh period or window (e.g., to conserve power, to preserve a remaining battery life, because the one or more maintenance operations take less time than a full refresh period or window, or the like). In some embodiments, a maintenance circuit 506 may increase a duration of a maintenance period over time (e.g., based on a program/erase count or other age indicator for a non-volatile memory device 120, for a non-volatile memory element 123, for a region of a non-volatile memory element 123, or the like), to provide more maintenance over time as the non-volatile memory device 120 ages. In one embodiment, the read/write circuit 504 may perform read and/or write operations after a maintenance period even if a refresh period has not completed, if the maintenance period is defined to be shorter than the refresh period.

In one embodiment, the read/write circuit 504 is configured to execute read and/or write operations on a non-volatile memory device 120 (e.g., a non-volatile dual inline memory module (DIMM) or the like) in response to the interface circuit 502 receiving read and/or write commands, or the like. Because, as described below, the maintenance circuit 506 may perform maintenance operations during a predefined refresh time period after the interface circuit 502 receives a refresh command, in certain embodiments, the read/write circuit 504 may perform read and/or write operations synchronously (e.g., without the maintenance circuit 506 performing maintenance operations in the background during execution of read and/or write operations by the read/write circuit 504, or the like).

In certain embodiments, a non-volatile memory device 120 may comprise write-in-place memory elements 123 (e.g., storage class memory (SCM) such as PCM, ReRAM, MRAM, or the like), with memory cells which may be programmed with data without the previously stored data first being erased, and the read/write circuit 504 may program write data in place without first erasing the associated memory cells. In other embodiments, the read/write circuit 504 may erase memory cells of a non-volatile memory device 120 prior to programming the memory cells (e.g., for NAND flash non-volatile memory elements 123, or the like).

In one embodiment, the maintenance circuit 506 is configured to perform one or more maintenance operations on a non-volatile memory device 120 (e.g., a non-volatile dual inline memory module (DIMM) or the like) in response to the interface circuit 502 receiving a refresh command from a memory controller 402 over a memory bus 125. The maintenance circuit 506, in certain embodiments, may perform the one or more maintenance operations synchronously, in the foreground, during a predefined period of time after the interface circuit 502 receives a refresh command (e.g., rather than performing one or more maintenance operations in the background, delaying read and/or write operations of the read/write circuit 504, or the like).

A maintenance operation, as used herein, may comprise a management and/or system operation for one or more memory elements 123 of a memory medium 122. For example, the maintenance circuit 506, in certain embodiments, performs a maintenance operation in response to a refresh command from a memory controller 402, rather than in response to a read and/or write request from a storage client 116, or the like. In one embodiment, the maintenance circuit 506 may cooperate with the read/write circuit 504, to read and/or write data internally within a non-volatile memory device 120 as part of a maintenance operation (e.g., to read data from a location and to write the data back to the same or a different location; to read data from a location, rotate the data, and write it back to the same or different location; to read data from a location and write the data to a different location; to swap locations; or the like).

As described below with regard to the refresh circuit 602 of FIG. 6, in certain embodiments, the maintenance circuit 506 performs a maintenance operation comprising a memory refresh operation. For example, the maintenance circuit 506 may perform a memory refresh operation by reading data from a location or region of a non-volatile memory element 123 and may re-write at least a portion of the read data back to the same location or region of the non-volatile memory element 123. In certain embodiments, the maintenance circuit 506 may rotate, shift, and/or otherwise adjust or reorganize read data being written back to a region of a non-volatile memory element 123 for a memory refresh operation (e.g., providing wear leveling within a region of a non-volatile memory element 123, such as a block, a page, a word line, a die, a die plane, a row, a column, a chip, and/or another region of memory).

As described below with regard to the wear leveling circuit 604 of FIG. 6, in certain embodiments, the maintenance circuit 506 performs a maintenance operation comprising a memory wear leveling operation. For example, the maintenance circuit 506 may perform a memory wear leveling operation reading data from a region of a non-volatile memory element 123 and writing at least a portion of the read data to a different region of a non-volatile memory element 123 (e.g., providing wear leveling between different regions of one or more non-volatile memory elements 123, such as a block, a page, a word line, a die, a die plane, a chip, and/or another region of memory). For example, the maintenance circuit 506 may perform a memory wear leveling operation or other maintenance operations such as a garbage collection or storage capacity recovery operation to move valid data to a different region of memory while recovering storage capacity of unused or invalid data, rewriting data to a different region of memory to prevent data loss, or the like during a predefined period of time after the interface circuit 502 receives a refresh command (e.g., periodically in response to a predefined temperature condition, a predefined time condition, a predefined read disturb condition, a predefined write disturb condition, or the like being satisfied prior to the interface circuit 502 receiving the refresh command, or the like).

As described below with regard to the retirement circuit 606 of FIG. 6, in certain embodiments, the maintenance circuit 506 performs a maintenance operation comprising a replacement operation. For example, the maintenance circuit 506 may perform a replacement operation replacing and/or retiring a region of memory (e.g., failing and/or near failing memory cells, a region of memory satisfying an error threshold and/or another retirement threshold, or the like). The maintenance circuit 506 may logically remap spare or extra storage regions of a non-volatile memory element 123 to replace a different storage region of a non-volatile memory element 123, or the like. The maintenance circuit 506 may swap one or more used portions of a non-volatile memory element 123 with one or more less used portions of the non-volatile memory element 123 by moving one or several locations during one refresh period, and moving a next location during a next refresh period, or the like. To swap one location of memory for another, in certain embodiments, the maintenance circuit 506 may use multiple refresh periods (e.g., read location x during a first refresh period, read location y during a second refresh period, write data from location x in location y during a third refresh period, write data from location y in location x during a fourth refresh period, increment a refresh pointer during a fifth refresh period, repeat the process for another swap, or the like).

In certain embodiments, the maintenance circuit 506 may selectively skip performance of one or more maintenance operations in response to one or more refresh commands. For example, the maintenance circuit 506 may refresh, wear level, and/or manage retirement for memory cells of the non-volatile memory medium 122 (e.g., one or more non-volatile memory elements 123) faster and/or in less time than is available during predefined refresh windows after refresh commands (e.g., since the refresh commands' period and/or a size of a refresh window may be selected based on one or more characteristics of volatile memory). To conserve power, during certain refresh periods of time after one or more refresh commands, the maintenance circuit 506 may selectively skip performance of a maintenance operation. For example, the maintenance circuit 506 may skip refresh cycles used for wear leveling swaps more often if a higher percentage of operations are reads instead of writes (e.g., reducing an urgency of wear leveling, or the like).

In certain embodiments, the maintenance circuit 506 may split a maintenance operation across multiple refresh periods of time. For example, the maintenance circuit 506 may read data from a region of memory during a first refresh period of time after the interface circuit 502 receives a first refresh command, and may write the read data during a second refresh period of time after the interface circuit 502 receives a second refresh command (e.g., to a same region of memory for a refresh maintenance operation, to a different region of memory for a wear-leveling maintenance operation and/or a replacement maintenance operation, or the like). Splitting performance of a maintenance operation across multiple refresh periods, in various embodiments, may reduce power consumption, may facilitate completing a step of a maintenance operation within an allowed refresh period, may allow a longer maintenance operation to be performed in steps, or the like.

Figure 6:
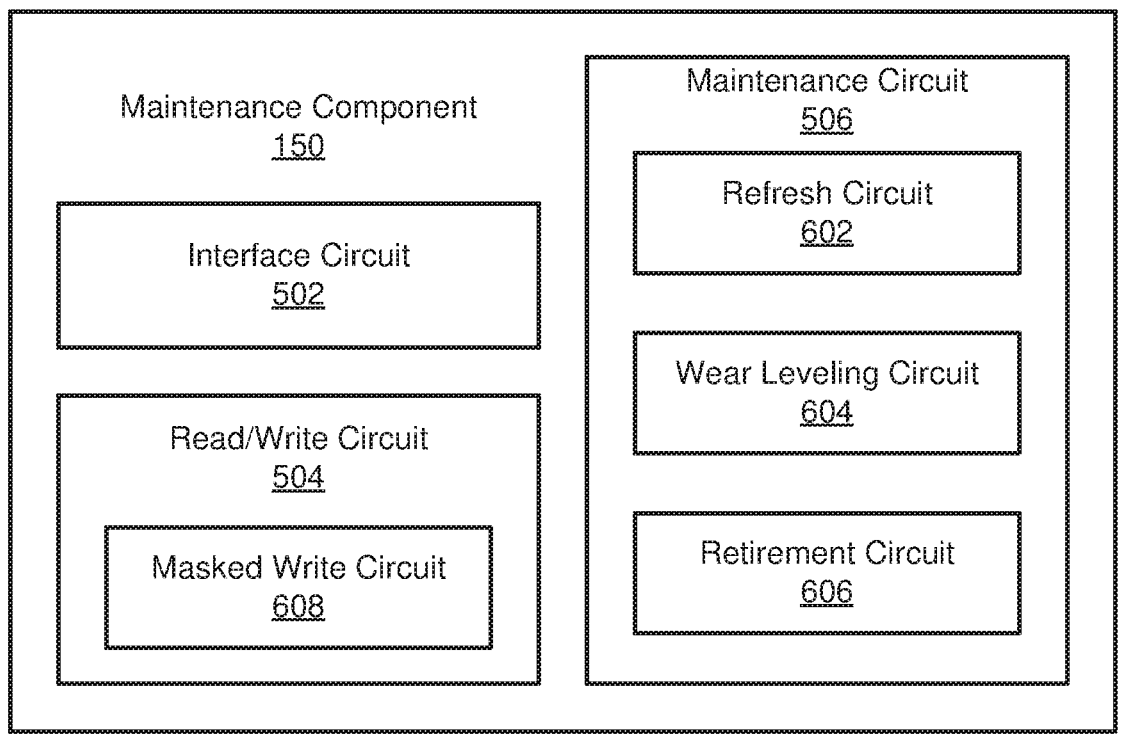
FIG. 6 is a schematic block diagram illustrating a further embodiment of a maintenance component.

FIG. 6 depicts a further embodiment of a maintenance component 150. In certain embodiments, the maintenance component 150 may be substantially similar to one or more of the maintenance circuits 150 described above with regard to FIG. 1, FIG. 2, and/or FIG. 5. The maintenance component 150, in the depicted embodiment, includes an interface circuit 502, a read/write circuit 504 which includes a masked write circuit 608, and a maintenance circuit 506 which includes a refresh circuit 602, a wear leveling circuit 604, and a retirement circuit 606. In certain embodiments, one or more of the interface circuit 502, the read/write circuit 504, and/or the maintenance circuit 506 may be substantially similar to the interface circuit 502, the read/write circuit 504, and/or the maintenance circuit 506 described above with regard to FIG. 5.

In one embodiment, the refresh circuit 602 is configured to perform a maintenance operation comprising a memory refresh operation. For example, the refresh circuit 602 may cooperate with the read/write circuit 504 to perform a memory refresh operation comprising reading data from a region of a non-volatile memory element 123 and re-writing at least a portion of the read data back to the same region of the non-volatile memory element 123. In certain embodiments, the refresh circuit 602 may rotate, shift, and/or otherwise adjust or reorganize read data the refresh circuit 602 writes back to a region of a non-volatile memory element 123 for a memory refresh operation (e.g., providing wear leveling within a region of a non-volatile memory element 123, such as a block, a page, a word line, an ECC code word, a row, a column, a die, a die plane, a chip, and/or another region of memory).

For example, the refresh circuit 602 may use a rolling shift (e.g., shifting each bit of data to a next address of a region, rolling a last bit around to a first bit, or the like) for each refresh maintenance operation for a region of a non-volatile memory element 123, may use a random shift for each refresh maintenance operation of a region of a non-volatile memory element 123 (e.g., using a mapping table or the like to track the randomization), and/or may otherwise rotate and/or shift data during a refresh maintenance operation. A region of a non-volatile memory element 123, in certain embodiments, may comprise one or more extra memory cells (e.g., an extra bit line, an extra word line, or the like) which the refresh circuit 602 may use to rotate and/or shift data into during a refresh maintenance operation.

In one embodiment, the wear leveling circuit 604 is configured to perform a maintenance operation comprising a memory wear leveling operation. For example, the wear leveling circuit 604 may perform a memory wear leveling operation reading data from a region of a non-volatile memory element 123 and writing at least a portion of the read data to a different region of a non-volatile memory element 123 (e.g., providing wear leveling between different regions of one or more non-volatile memory elements 123, such as a block, a page, a word line, a die, a die plane, a chip, and/or another region of memory). For example, the wear leveling circuit 604 may perform a memory wear leveling operation such as a garbage collection or storage capacity recovery operation to move valid data to a different region of memory while recovering storage capacity of invalid data, rewriting data to a different region of memory to prevent data loss, or the like during a predefined period of time after the interface circuit 502 receives a refresh command (e.g., periodically in response to a predefined temperature condition, a predefined time condition, a predefined read disturb condition, a predefined write disturb condition, or the like being satisfied prior to the interface circuit 502 receiving the refresh command, or the like).

In certain embodiments, when used in combination, the refresh circuit 602 may provide wear leveling within a region of a non-volatile memory medium 122 and the wear leveling circuit 604 may provide wear leveling between different regions of the non-volatile memory medium 122. The wear leveling circuit 604, in one embodiment, may copy and/or move data from a region of the non-volatile memory medium 122 that has been written less frequently than the refresh circuit 602 rotates or otherwise moves data within the region of the non-volatile memory medium 122, or the like.

In one embodiment, the retirement circuit 606 is configured to perform a maintenance operation comprising a replacement operation. For example, the retirement circuit 606 may perform a replacement operation replacing and/or retiring a region of non-volatile memory of the non-volatile memory medium 122 (e.g., failing and/or near failing memory cells, a region of memory satisfying an error threshold and/or another retirement threshold, or the like). The retirement circuit 606 may logically remap into spare or extra storage regions of a non-volatile memory element 123 to replace a different storage region of a non-volatile memory element 123, or the like. The non-volatile memory device 120, in certain embodiments, may include one or more extra and/or spare regions of a non-volatile memory medium 122 (e.g., one or more spare blocks, pages, word lines, bit lines, rows, columns, ECC codewords, die, die planes, chips, or the like) which the retirement circuit 606 may use to substitute and/or replace a region of the non-volatile memory medium 122 satisfying a replacement threshold.

In one embodiment, the masked write circuit 608 is configured to program only data values that are different than currently stored data values for write operations executed by the read/write circuit 504 but to program each data value (e.g., even if a stored value is being overwritten with the same value) for write operations executed by the maintenance circuit 506 (e.g., one or more of the refresh circuit 602, the wear leveling circuit 604, and/or the retirement circuit 606).

For example, the masked write circuit 608 may conserve power, reduce wear on the non-volatile memory medium 122, or the like by skipping programming of data when the data being written is the same as data already stored (e.g., on a bit by bit basis). For example, the masked write circuit 608 may read data from a region of the non-volatile memory medium 122 (e.g., a byte, a page, a word line, a block, or the like), compare the read data to the write data being written (e.g., using one or more logic operations such as a logical AND to determine which bits are the same, a logical exclusive OR (XOR) to indicate which bits are different, or the like) to create a bit mask, and may write and/or program data only when the bit mask indicates that the data being written is different than the data already stored. The masked write circuit 608 may disable masked writing (e.g., skipping of writing/programming a bit value over a similar bit value) for maintenance operations, to ensure that each bit of data is refreshed as it is being moved, copied, refreshed, wear leveled, shifted, rotated, or the like as part of a maintenance operation is properly written/programmed (e.g., to minimize data errors, to refresh each memory cell associated with the maintenance operation, or the like).

FIG. 7 is a table 700 including various embodiments of memory commands 712a-i. In the depicted embodiment, the commands 712a-i are indicated to a memory device 120 by a controller 402 over a memory bus 125, using one or more of a chip enable/chip select (CS) line 702, a row address strobe (RAS) line 704, a column address strobe (CAS) line 706, a write enable (WE) line 708, and/or one or more address lines 710.

As described above, in certain embodiments, a refresh command 712h may comprise a low voltage state on the chip enable/chip select (CS) line 702, a low voltage state on the row address strobe (RAS) line 704, a low voltage state on the column address strobe (CAS) line 706, a high voltage state on the write enable (WE) line 708, and/or another predefined state or combination of states on lines of the memory bus 125.

The graph 700 also depicts embodiments of other commands 712. For example, a high voltage state on the chip enable/chip select (CS) line 702 may comprise a command inhibit command 712a, inhibiting commands for a memory element 123 so the non-volatile memory element 123 ignores all other input pins while the CS line 702 is high (e.g., regardless of a state of other lines 704, 706, 708, 710). A low voltage state on the chip enable/chip select (CS) line 702, a high voltage state on the row address strobe (RAS) line 704, a high voltage state on the column address strobe (CAS) line 706, and a high voltage state on the write enable (WE) line 708 may comprise a no operation (NO OP) command 712b, in response to which no operation is performed (e.g., as a waiting period or the like).

A low voltage state on the chip enable/chip select (CS) line 702, a high voltage state on the row address strobe (RAS) line 704, a high voltage state on the column address strobe (CAS) line 706, and a low voltage state on the write enable (WE) line 708 may comprise a burst terminate command 712c, in response to which the read/write circuit 504 stops a burst read and/or burst write that is in progress. A low voltage state on the chip enable/chip select (CS) line 702, a high voltage state on the row address strobe (RAS) line 704, a low voltage state on the column address strobe (CAS) line 706, a high voltage state on the write enable (WE) line 708, and a column address on the one or more address lines 710, may comprise a read command 712d, in response to which the read/write circuit 504 reads data indicated by the column address from a currently active row. A low voltage state on the chip enable/chip select (CS) line 702, a high voltage state on the row address strobe (RAS) line 704, a low voltage state on the column address strobe (CAS) line 706, a low voltage state on the write enable (WE) line 708, and a column address on the one or more address lines 710, may comprise a write command 712e, in response to which the read/write circuit 504 writes data to a location indicated by the column address and the currently active row.

A low voltage state on the chip enable/chip select (CS) line 702, a low voltage state on the row address strobe (RAS) line 704, a high voltage state on the column address strobe (CAS) line 706, a high voltage state on the write enable (WE) line 708, and a row address on the one or more address lines 710, may comprise an activate command 712f, in response to which the read/write circuit 504 activates the indicated row for reading and/or writing. A low voltage state on the chip enable/chip select (CS) line 702, a low voltage state on the row address strobe (RAS) line 704, a high voltage state on the column address strobe (CAS) line 706, and a low voltage state on the write enable (WE) line 708, may comprise a precharge/deactivate command 712g, in response to which the read/write circuit 504 may precharge and/or deactivate the currently active row.

A low voltage state on the chip enable/chip select (CS) line 702, a low voltage state on the row address strobe (RAS) line 704, a low voltage state on the column address strobe (CAS) line 706, a low voltage state on the write enable (WE) line 708, and a mode indicator on the one or more address lines 710, may comprise a load mode register command 712i, in response to which the read/write circuit 504 may load the mode indicator into a mode register for the non-volatile memory element 123. The commands 712a-i and associated signal states 702, 704, 706, 708, 710 are provided as non-limiting examples, and other commands and/or signal states may be used in other embodiments.

Figure 8:
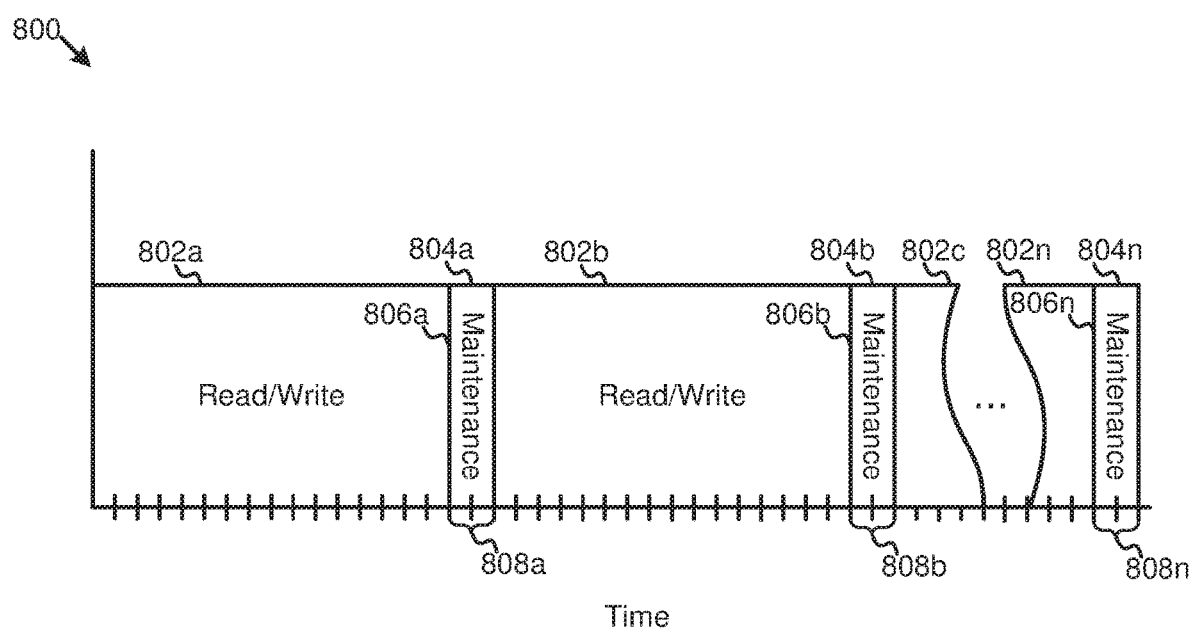
FIG. 8 is a schematic block diagram illustrating one embodiment of a graph for memory maintenance operations during a refresh window performed over time.

FIG. 8 depicts one embodiment of a graph 800 of memory maintenance operations 804a-n during refresh windows 808a-n over time. In the depicted embodiment, the read/write circuit 504 synchronously performs one or more read and/or write operations 802a-n on a non-volatile memory element 123. In response to the interface circuit 502 receiving a periodic refresh command 806a-n, the maintenance circuit 506 may "no-op" (e.g., perform no maintenance operation) or synchronously perform one or more maintenance operations 804a-n on the non-volatile memory element 123 during periodic refresh periods of time 808a-n occurring after each refresh period 806a-n is received.

In certain embodiments, the read/write circuit 504 does not perform read and/or write operations 802a-n during the periodic refresh periods of time 808a-n, and the maintenance circuit 506 either "no-ops" or performs maintenance operations 804a-n exclusively during the periodic refresh periods of time 808a-n. In one embodiment, the maintenance circuit 506 may selectively "no-op" or skip performance of one or more maintenance operations 804a-n (e.g., if a maintenance threshold is satisfied, if an error threshold is satisfied, to conserve power, or the like) in response to the interface module 502 receiving a refresh command 806a-n.

Figure 9:
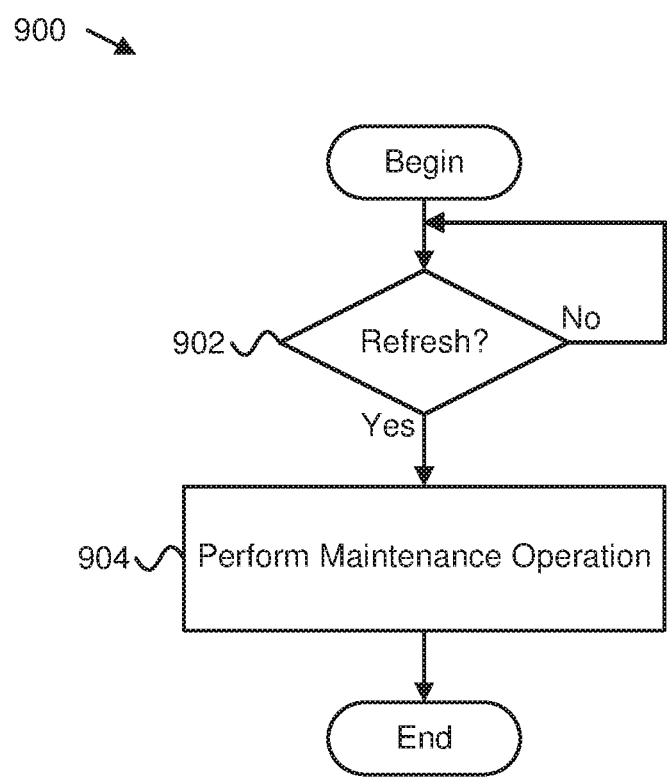
FIG. 9 is a schematic flow chart diagram illustrating one embodiment of a method for memory maintenance operations during a refresh window.

FIG. 9 depicts one embodiment of a method 900 for memory maintenance operations 804a-n during a refresh window 808a-n. For example, the method 900 may be performed if one or more characteristics and/or conditions of a non-volatile memory device 120 and/or a non-volatile memory element 123 warrant not skipping the memory maintenance operations 804a-n (e.g. a number of writes to a non-volatile memory device 120 and/or to a non-volatile memory element 123 satisfy a maintenance threshold, or the like).

The method 900 begins and a non-volatile memory device 120 receives 902 a refresh command 808a-n from a controller 402 over a bus 125. The non-volatile memory device 120 performs 904 one or more maintenance operations 804a-n on a non-volatile memory medium 122 of the non-volatile memory device 120 during a predefined period of time 808a-n after receiving the refresh command 808a-n and the method ends.

Figure 10:
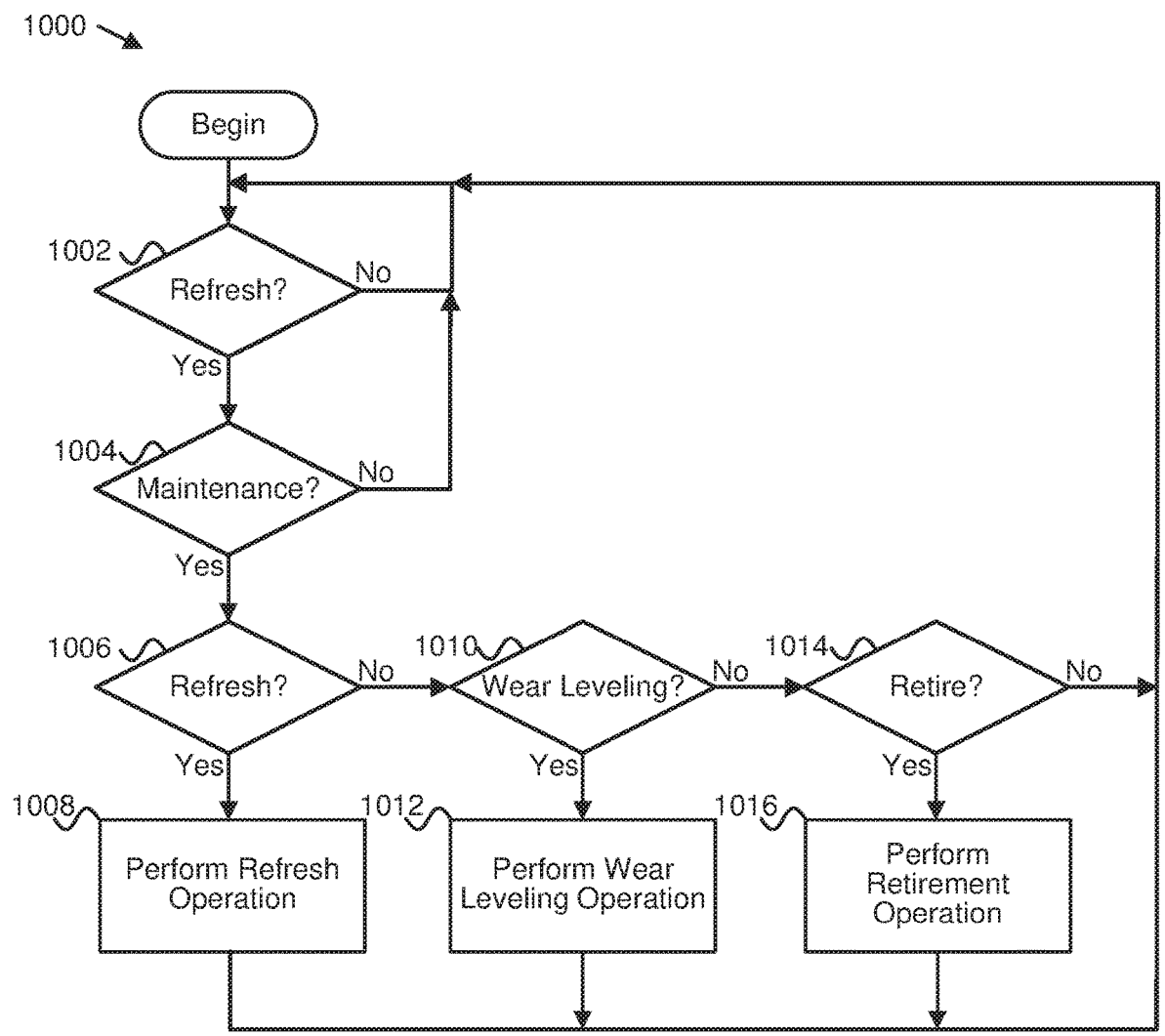
FIG. 10 is a schematic flow chart diagram illustrating a further embodiment of a method for memory maintenance operations during a refresh window.

FIG. 10 depicts a further embodiment of a method 1000 for memory maintenance operations 804a-n during a refresh window 808a-n. The method 1000 begins, and an interface circuit 502 periodically receives 1002 a refresh command 808a-n from a controller 402 over a memory bus 125. A maintenance circuit 506 determines 1004 whether or not to perform a maintenance operation 804a-n on a non-volatile memory element 123 of non-volatile memory media 122. If the maintenance circuit 506 selectively determines 1004 not to perform a maintenance operation 804a-n, the method 1000 continues until the interface circuit 502 receives 1002 a subsequent refresh command 808a-n from the controller 402 over the memory bus 125.

If the maintenance circuit 506 determines 1004 to perform a maintenance operation 804a-n, the maintenance circuit 506 determines 1006, 1010, 1014 whether or not to perform a refresh operation, a wear leveling operation, and/or a retirement operation. If the maintenance circuit 506 determines 1006 to perform a refresh operation, the refresh circuit 602 performs 1008 a refresh operation on one or more regions of a non-volatile memory medium 122. If the maintenance circuit 506 determines 1010 to perform a wear leveling operation, the wear leveling circuit 604 performs 1012 a wear leveling operation on one or more regions of a non-volatile memory medium 122. If the maintenance circuit 506 determines 1014 to perform a retirement operation, the retirement circuit 606 performs 1016 a retirement operation on one or more regions of a non-volatile memory medium 122. The method 1000 continues until the interface circuit 502 receives 1002 a subsequent refresh command 808a-n from the controller 402 over the memory bus 125.

A means for periodically receiving refresh commands and/or triggers at a non-volatile memory element 123 over a bus 125, in various embodiments, may include an electrical pin, pad, or other contact; a maintenance component 150; an interface circuit 502; a maintenance circuit 506; a device controller 126; an on-die controller 220; a state machine 222; an integrated circuit device; an FPGA; an ASIC; other logic hardware; and/or other executable code stored on a computer readable storage medium. Other embodiments may include similar and/or equivalent means for periodically receiving refresh commands and/or triggers at a non-volatile memory element 123 over a bus 125.

A means for wear leveling one or more regions of a non-volatile memory element 123 exclusively during a predefined time period after receiving one or more of refresh commands and/or triggers, in various embodiments, may include a maintenance component 150, a maintenance circuit 506, a wear leveling circuit 604, a refresh circuit 602, a retirement circuit 606, a read/write circuit 504, a device controller 126, an on-die controller 220, a state machine 222, an integrated circuit device, an FPGA, an ASIC, other logic hardware, and/or other executable code stored on a computer readable storage medium. Other embodiments may include similar and/or equivalent means for wear leveling one or more regions of a non-volatile memory element 123 exclusively during a predefined time period after receiving one or more of refresh commands and/or triggers.

A means for selectively skipping wear leveling in response to receiving one or more refresh commands and/or triggers, in various embodiments, may include a maintenance component 150, a maintenance circuit 506, a wear leveling circuit 604, a refresh circuit 602, a retirement circuit 606, a read/write circuit 504, a device controller 126, an on-die controller 220, a state machine 222, an integrated circuit device, an FPGA, an ASIC, other logic hardware, and/or other executable code stored on a computer readable storage medium. Other embodiments may include similar and/or equivalent means for selectively skipping wear leveling in response to receiving one or more refresh commands and/or triggers.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
a non-volatile memory device comprising a non-volatile memory medium, the non-volatile memory device configured to:
receive a refresh command from a controller over a bus;
perform one or more maintenance operations on the non-volatile memory medium only during a predefined period of time after receiving the refresh command.

2. The apparatus of claim 1, wherein the non-volatile memory device is configured to perform the one or more maintenance operations during the predefined period of time after receiving the refresh command and not to perform maintenance operations during other times such that the non-volatile memory device operates in a synchronous manner for read and write operations from the controller.

3. The apparatus of claim 1, wherein the non-volatile memory device is configured to receive the refresh command periodically from the controller.

4. The apparatus of claim 3, wherein the non-volatile memory device is configured to selectively skip performing one or more maintenance operations in response to one of the periodically received refresh commands.

5. The apparatus of claim 3, wherein the one or more maintenance operations comprise rotating data within a region of the non-volatile memory medium during the predefined period of time and the non-volatile memory device is configured to write the data from the region of the non-volatile memory medium to a different region of the non-volatile memory medium during a predefined period of time after receiving a subsequent refresh command of the periodically received refresh commands.

6. The apparatus of claim 3, wherein the one or more maintenance operations comprise reading data from a region of the non-volatile memory medium in response to receiving the refresh command, and the non-volatile memory device is configured to buffer the read data and to write the buffered data to a different region of the non-volatile memory medium in response to receiving a subsequent one of the periodically received refresh commands.

7. The apparatus of claim 1, wherein the bus comprises a host memory bus of a host processor.

8. The apparatus of claim 7, wherein the controller comprises a double data rate volatile memory controller for the host processor.

9. The apparatus of claim 8, wherein the non-volatile memory device comprises a non-volatile dual inline memory module compatible with a volatile dual inline memory module memory socket.

10. The apparatus of claim 9, wherein the refresh command comprises a volatile memory refresh command and the one or more maintenance operations comprise one or more non-volatile memory maintenance operations.

11. The apparatus of claim 1, wherein the one or more maintenance operations comprise a wear leveling operation moving data from at least one block of the non-volatile memory medium to another block of the non-volatile memory medium.

12. The apparatus of claim 1, wherein the one or more maintenance operations comprise a replacement operation substituting a region of the non-volatile memory medium satisfying a replacement threshold with a different region of the non-volatile memory medium.

13. A system comprising:
a host memory bus for a host processor;
a memory controller for the host processor, the memory controller sending periodic refresh commands over the host memory bus; and
a non-volatile memory module that receives the periodic refresh commands from the memory controller over the host memory bus and that synchronously performs maintenance operations for the non-volatile memory module only in response to receiving the periodic refresh commands.

14. The system of claim 13, further comprising:
a motherboard comprising the host memory bus, wherein the host processor, the memory controller, and the non-volatile memory module are electrically coupled to the motherboard;
a volatile memory socket coupled to the motherboard and to the host memory bus, the volatile memory socket comprising volatile memory mechanical and electrical connections configured to receive a volatile memory module, the non-volatile memory module comprising complimentary mechanical and electrical connections configured to interface with the volatile memory mechanical and electrical connections such that the non-volatile memory module receives the periodic refresh commands over the host memory bus.

15. A method comprising:
receiving a first refresh command at a non-volatile memory device from a controller over a bus;
performing a first maintenance operation on the non-volatile memory device in response to receiving the first refresh command;
receiving a second refresh command at the non-volatile memory device from the controller over the bus; and
selectively determining not to perform a second maintenance operation on the non-volatile memory device in response to receiving the second refresh command.

16. The method of claim 15, wherein the first maintenance operation comprises moving data within a memory block of the non-volatile memory device, the method further comprising:
receiving a third refresh command at the non-volatile memory device from the controller over the bus; and
performing a different maintenance operation on the non-volatile memory device in response to receiving the third refresh command, the different maintenance operation comprising moving the data from the memory block to a different memory block of the non-volatile memory device.

17. The method of claim 15, wherein the first maintenance operation comprises reading data from a memory block of the non-volatile memory device and buffering the read data, the method further comprising:
receiving a third refresh command at the non-volatile memory device from the controller over the bus; and
writing the buffered data in response to receiving the third refresh command.

18. The method of claim 17, wherein the buffered data is written in place to the same memory block of the non-volatile memory device.

19. The method of claim 17, wherein the buffered data is written to shifted locations within the same memory block.

20. The method of claim 17, wherein the buffered data is written to a different memory block of the non-volatile memory device.

21. An apparatus comprising:
an interface circuit configured to receive commands for a non-volatile dual inline memory module over a memory bus;
a read/write circuit configured to execute read and write operations synchronously on the non-volatile dual inline memory module in response to the interface circuit receiving read and write commands; and
a maintenance circuit configured to perform one or more maintenance operations synchronously on the non-volatile dual inline memory module only in response to the interface circuit receiving a synchronous maintenance command.

22. The apparatus of claim 21, further comprising a masked write circuit configured to program only data values that are different than currently stored data values for write operations executed by the read/write circuit and to program each data value for write operations executed by the maintenance circuit.

23. An apparatus comprising:
means for periodically receiving refresh triggers at a non-volatile memory over a bus; and
means for wear leveling one or more regions of the non-volatile memory exclusively during a predefined time period after receiving one or more of the refresh triggers.

24. The apparatus of claim 23, further comprising means for selectively skipping wear leveling in response to receiving one or more other refresh triggers of the refresh triggers.

25. The apparatus of claim 23, wherein the means for wear leveling the one or more regions rotates data within the one or more regions after receiving a first refresh trigger of the one or more of the refresh triggers and moves data from the one or more regions to a different one or more regions of the non-volatile memory after receiving a second refresh trigger of the one or more of the refresh triggers.

* * * * *